United States Patent
Allan et al.

(10) Patent No.: US 8,561,429 B2
(45) Date of Patent: Oct. 22, 2013

(54) GLASS WITH COMPRESSIVE SURFACE FOR CONSUMER APPLICATIONS

(75) Inventors: Douglas Clippinger Allan, Corning, NY (US); Adam James Ellison, Painted Post, NY (US); Sinue Gomez, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/500,650

(22) Filed: Jul. 10, 2009

(65) Prior Publication Data

US 2010/0009154 A1    Jan. 14, 2010

Related U.S. Application Data

(60) Provisional application No. 61/079,995, filed on Jul. 11, 2008.

(51) Int. Cl.
    *C03C 15/00* (2006.01)
    *C03C 21/00* (2006.01)
    *C03C 3/091* (2006.01)
    *C03C 3/083* (2006.01)

(52) U.S. Cl.
    USPC ............ 65/30.13; 65/30.14; 65/400; 501/66; 501/68

(58) Field of Classification Search
    USPC ........... 501/66, 68, 69, 70, 72; 65/400, 30.13, 65/30.1, 30.14
    See application file for complete search history.

(56) References Cited

U.S. PATENT DOCUMENTS

| | | | |
|---|---|---|---|
| 3,410,673 A | | 11/1968 | Marusak |
| 3,524,737 A | | 8/1970 | Doyle et al. |
| 3,751,238 A | * | 8/1973 | Grego et al. ............ 65/30.14 |
| 3,752,729 A | | 8/1973 | Mochel |
| 3,773,489 A | * | 11/1973 | Forker et al. ............ 65/30.14 |
| 4,119,760 A | | 10/1978 | Rinehart |
| 4,156,755 A | | 5/1979 | Rinehart |
| 4,192,689 A | * | 3/1980 | Rinehart ..................... 501/70 |
| 4,471,024 A | * | 9/1984 | Pargamin et al. ............ 428/410 |
| 4,483,700 A | * | 11/1984 | Forker et al. ............ 65/30.14 |
| 5,846,280 A | * | 12/1998 | Speit ..................... 65/30.14 |
| 6,516,634 B1 | * | 2/2003 | Green et al. ............ 65/30.14 |
| 2008/0020919 A1 | * | 1/2008 | Murata ..................... 501/66 |
| 2008/0286548 A1 | | 11/2008 | Ellison et al. |
| 2009/0142568 A1 | | 6/2009 | Dejneka et al. |

FOREIGN PATENT DOCUMENTS

| | | |
|---|---|---|
| EP | 1038845 A | 9/2000 |
| EP | 1038845 A1 | 9/2000 |
| GB | 1342674 | 6/1971 |
| GB | 1346747 | 7/1972 |
| GB | 1342674 A | 1/1974 |
| GB | 1346747 A | 2/1974 |

OTHER PUBLICATIONS

Fundamentals of Inorganic Glasses, 2nd ed., 2006, by A. K. Varshneya.

(Continued)

*Primary Examiner* — Noah Wiese
(74) *Attorney, Agent, or Firm* — Robert P. Santandrea

(57) ABSTRACT

A strengthened glass that does not exhibit frangible behavior when subjected to impact or contact forces, and a method of strengthening a glass. The glass may be strengthened by subjecting it to multiple, successive, ion exchange treatments. The multiple ion exchange treatments provide a local compressive stress maximum at a depth of the strengthened layer and a second local maximum at or near (e.g., within 10 μm) the surface of the glass.

13 Claims, 3 Drawing Sheets

(56) References Cited

OTHER PUBLICATIONS

Relaxation in Glass and Composites, 1992, by G. W. Scherer.
The Mathematics of Diffusion, 2nd ed., 1975, by J. Crank.
U.S. Appl. No. 12/392,577, filed Feb. 25, 2009, by Matthew John Dejneka et al., entitled "Fining Agents for Silicate Glasses."
U.S. Appl. No. 12/393,241, filed Feb. 26, 2009, by Matthew John Dejneka et al., entitled "Ion-Exchanged, Fast Cooled Glasses."

* cited by examiner

GLASS WITH COMPRESSIVE SURFACE FOR CONSUMER APPLICATIONS

CROSS REFERENCE TO RELATED APPLICATION

This application claims the benefit of U.S. Provisional Patent Application No. 61/079,995, filed Jul. 11, 2008.

BACKGROUND

The present disclosure relates to a strengthened glass. More particularly, the disclosure relates to chemically strengthening glass by ion exchange. Even more particularly, the disclosure relates to chemically strengthening of glass by multiple ion exchange treatments.

Glasses may be chemically strengthened by an ion exchange process. In this process, metal ions that are present in a region at or near the surface of a glass are exchanged for larger metal ions, typically by immersion of the glass in a molten salt bath. The presence of the larger ions in the glass strengthens the glass by creating a compressive stress in a region near the surface. A tensile stress is induced within a central region of the glass to balance the compressive stress. If the tensile stress is excessive, the glass either becomes frangible—i.e., energetically fragments into a large number of small pieces—or crazes—i.e., cracks without the cracks penetrating the glass.

Chemically strengthened glasses have recently been identified for use in hand held devices, such as mobile phones, media players, and other devices, as well as other applications requiring transparency, high strength and abrasion resistance. For such applications, however, a glass that is either frangible or crazes upon impact is undesirable.

SUMMARY

A strengthened glass that does not exhibit frangible behavior when subjected to impact or contact forces and a method of chemically strengthening a glass are provided. The glass is strengthened by subjecting it to multiple ion exchange treatments. The multiple ion exchange treatments provide a local compressive stress maximum at a depth of the strengthened layer and a second local maximum at or near the surface of the glass.

Accordingly, one aspect of the disclosure is to provide a strengthened glass. The glass has an outer region under a compressive stress, the outer region extending from a surface of the glass to a depth of layer, and a central tensile region, the central tensile region being under an integrated central tension of less than or equal to a value in a range from about 2.8 MPa·cm up to about 3.2 MPa·cm.

A second aspect of the disclosure is to provide a method of making a glass that is substantially free of frangible behavior. The method comprises the steps of: providing the glass, the glass having a surface; and creating a compressive stress in an outer region to strengthen the glass, the outer region extending from the surface to a depth of layer, wherein the compressive stress creates an integrated central tension of less than or equal to a value in a range from about 2.8 MPa·cm up to about 3.2 MPa·cm in a central tensile region of the glass.

These and other aspects, advantages, and salient features of the present disclosure will become apparent from the following detailed description, the accompanying drawings, and the appended claims.

DETAILED DESCRIPTION

Figure 1:
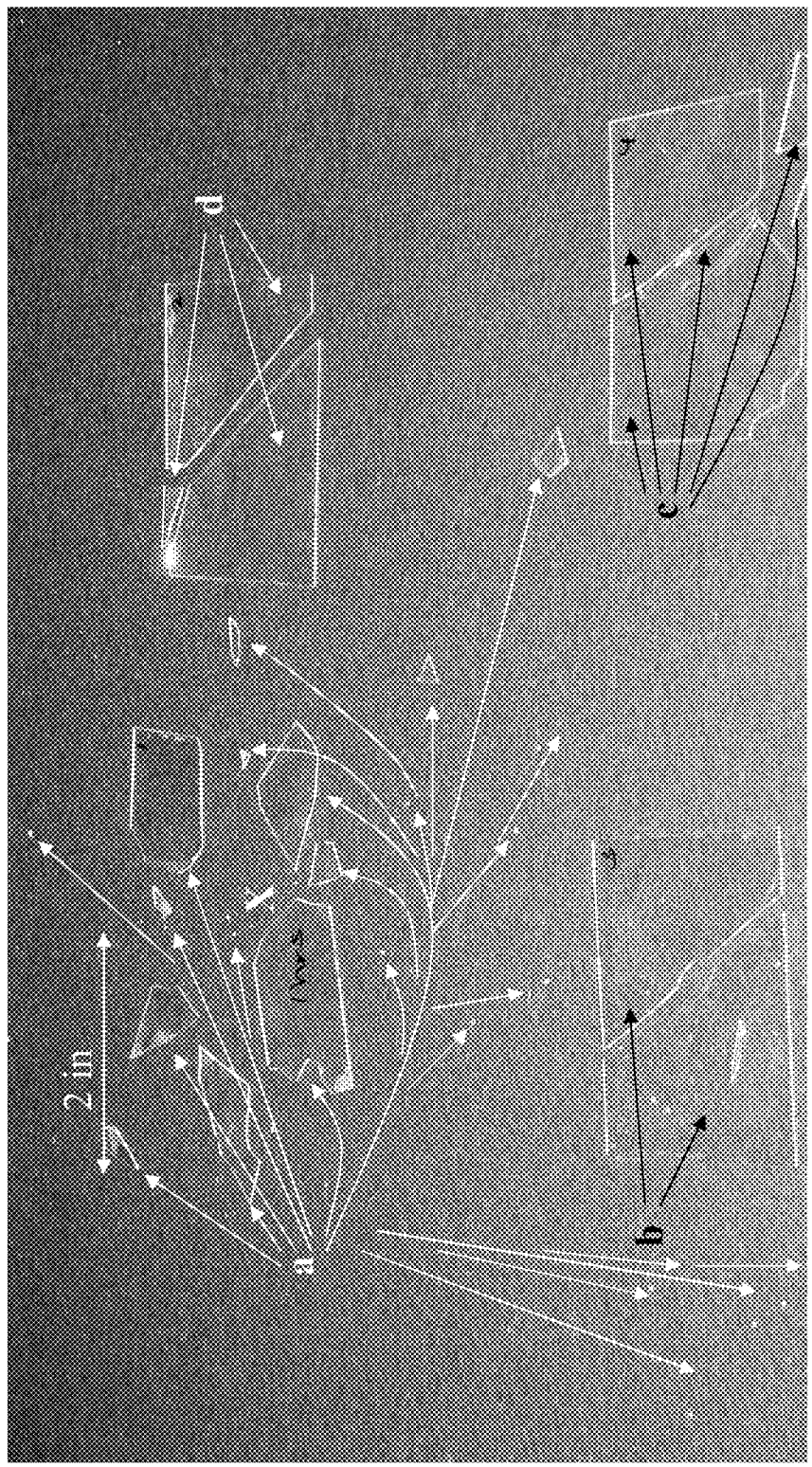
FIG. 1 is a photograph showing glass sheets that are frangible and not frangible.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any sub-ranges therebetween.

Referring to the drawings in general, it will be understood that the illustrations are for the purpose of describing particular embodiments of the disclosure and are not intended to limit the disclosure or the appended claims thereto. The drawings are not necessarily to scale, and certain features and certain views of the drawings may be shown exaggerated in scale or in schematic in the interest of clarity and conciseness.

It is desirable that, upon impact, glasses used in consumer products, such as portable consumer electronic devices, including cover plates, display windows, and the like, not be frangible upon impact; i.e., the glass does not break into multiple (greater than two), small pieces (e.g., ≤1 mm) when impacted by an object or striking a solid surface with sufficient force to break the glass. It is also desirable that glasses used in such applications do not "craze" upon impact; i.e., the glass cracks, but the cracks do not penetrate the thickness of the glass.

As used herein, the terms "frangible" and "frangibilty" refer to the energetic fracture of a glass plate or sheet, when subjected to a point impact by an object or a drop onto a solid surface with sufficient force to break the glass plate into multiple small pieces, with either multiple crack branching (i.e., greater than 5 multiple cracks branching from an initial crack) in the glass, ejection of pieces from their original location of at least two inches (about 5 cm), a fragmentation density of greater than about 5 fragments/cm$^2$ of the plate, or any combination of these three conditions. Conversely, a glass plate is deemed to be not frangible if it either does not break or breaks with less than five multiple cracks branching from an initial crack with pieces ejected less than two inches from their original location when subjected to a point impact by an object or a drop onto a solid surface with sufficient force to break the glass plate.

Examples of frangible and non-frangible behavior observed for 5 cm×5 cm glass plates, each having a thickness of 0.5 mm, are shown in FIG. 1. Glass plate a exhibits frangible behavior, as evidenced by the multiple small pieces that have been ejected more than two inches, and a large degree of crack branching from the initial crack to produce the small pieces. In contrast to glass plate a, glass plates b, c, and d do not exhibit frangible behavior. In these instances, the glass plate breaks into a small number of large pieces that are not forcefully ejected 2 inches from their original location ("X" is the approximate center of glass plate a before fracture). Glass plate b has broken into two large pieces with no crack branching; glass plate c has broken into four pieces with two cracks branching from the initial crack; and glass plate d has broken into four pieces with two cracks branching from the initial crack.

What is desired is a direct link between the amount of compressive stress and its distribution through the near-surface region (i.e., within 10 μm of the surface) of the glass, the associated tensile stress through the center region of the glass, and the tendency of glass to become frangible under too much stress. Furthermore, since damage resistance tends to scale directly with the thickness of the layer under compression, a linkage between stress and frangibility, specifically for glasses with compressive layers typically having a depth (depth of layer) of 50 microns or more, is sought. In a particular embodiment, this linkage is sought for aluminosilicate glasses, such as those described in U.S. patent application Ser. No. 11/888,213, filed on Jul. 31, 2007 by Adam James Ellison et al.; entitled "Down-Drawable, Chemically Strengthened Glass for Cover Plate," which claims priority from U.S. Provisional Patent Application 60/930,808, filed on May 22, 2007, and having the same title; U.S. patent application Ser. No. 12/277,573, filed on Nov. 25, 2008, by Matthew John Dejneka et al., entitled "Glasses Having Improved Toughness and Scratch Resistance," which claims priority from U.S. Provisional Patent Application 61/004, 677, filed on Nov. 29, 2007, and having the same title; U.S. patent application Ser. No. 12/392,577, filed on Feb. 25, 2009, by Matthew John Dejneka et al., entitled "Fining Agents for Silicate Glasses," which claims priority from U.S. Provisional Patent Application 61/067,130, filed on Feb. 26, 2008, and having the same title; and U.S. patent application Ser. No. 12/393,241 filed Feb. 26, 2009, by Matthew John Dejneka et al., entitled "Ion-Exchanged, Fast Cooled Glasses;" which claims priority from U.S. Provisional Patent Application 61/067,732, filed on Feb. 29, 2008, and having the same title. The contents the above-referenced patent applications are incorporated herein by reference in their entirety.

Figure 2:
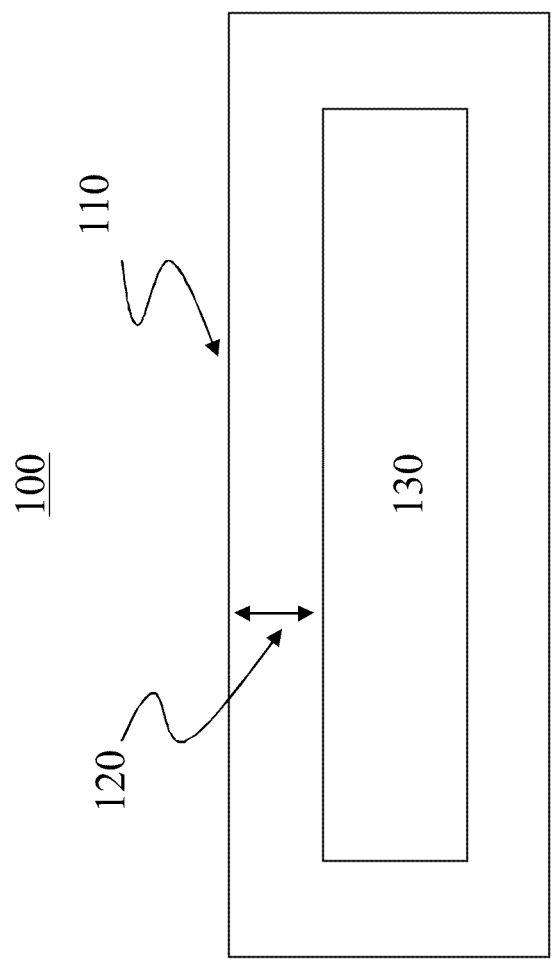
FIG. 2 is a schematic representation of a glass sheet.

Described herein is a strengthened glass. In one embodiment, the glass is in the form of a plate, planar sheet, or a three-dimensional curved object or sheet having a thickness ranging from about 0.5 to 3 mm. A schematic representation of a cross-sectional view of a glass sheet is shown in FIG. 2. The glass 100 is subjected to a process in which there a compressive stress is created at or near the surface 110, and wherein the surface itself is under at least some compressive stress. In one embodiment, the compressive stress is at least 200 MPa. The depth of the layer ("depth-of-layer," or "DOL") 120 that is under compression is at least about 50 μm.

The compressive stress near surface 110 induces a tensile stress in a central region 130 to balance the forces within the glass. The integrated central tension (ICT) is given by the integral of stress throughout the tensile portion of the stress profile. ICT is related to the full thickness of glass 100, the depth of the compressive stress layer, and the shape or profile of the compressive stress layer. ICT is the average of the tensile stress multiplied by the length of the tensile stress region in a direction perpendicular to the surface, expressed herein in MPa·cm. By force balance, the integrated surface compression will be precisely the same magnitude as the ICT, but have an opposite (minus) sign, since the overall integrated stress must be zero. In order for a glass to not be frangible when subjected to a point impact sufficient to cause the part to break, the integral of the volume of central region 130 under tension is less than or equal to a value in a range from about 2.8 MPa·cm up to about 3.2 MPa·cm and, in some embodiments, is less than or equal to about 3.0 MPa·cm.

In one embodiment, the alkali aluminosilicate glass comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤MgO+CaO≤10 mol %. In another embodiment, the alkali aluminosilicate glass comprises, consists essentially of, or consists of: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol % CaO≤5 mol %, and wherein 66 mol %≤$SiO_2+B_2O_3$+CaO≤69 mol %; $Na_2O+K_2O+B_2O_3$+MgO+CaO+SrO≤10 mol %; 5 mol %≤MgO+CaO+SrO≤8 mol %; $(Na_2O+B_2O_3)-Al_2O_3$≥2 mol %; 2 mol %≤$Na_2O-Al_2O_3$≤6 mol %; and 4 mol %≤$(Na_2O+K_2O)-Al_2O_3$≤10 mol %. The alkali aluminosilicate glass is, in some embodiments, substantially free of lithium, whereas in other embodiments, the alkali aluminosilicate glass is substantially free of at least one of arsenic, antimony, and barium. In other embodiments, the alkali aluminosilicate glass has a liquidus viscosity of at least 130 kilopoise and is down-drawable by those techniques known in the art, such as, but not limited to, fusion-draw processes, slot-draw processes, and re-draw processes.

In one particular embodiment, the alkali aluminosilicate glass has the composition: 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$. In another particular embodiment, the alkali aluminosilicate glass has the composition: 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$.

The process that is used to create the compressive stress at or near the surface 110 (i.e., within 10 μm of the surface) of the glass extending to the depth of layer comprises a plurality of—or multiple—strengthening steps. The multiple strengthening steps are carried out in succession of—and separate from—each other. In another embodiment, at least one additional step, such as annealing, washing, preheating, or the like, may be carried out between successive strengthening steps. In a third embodiment, the strengthening steps include chemical strengthening steps known in the art, such as, but not limited to, ion exchange steps. In one embodiment, the strengthening steps are ion exchange steps in which the glass, which itself initially comprises alkali metal ions, is immersed in a series of salt baths containing alkali metal ions that are larger than those alkali metal ions present in the glass. In one embodiment, successive salt baths have compositions that are different from each other. Alternatively, successive salt baths can have essentially the same composition. As used herein, the terms "salt bath" and "bath" refer to such baths used for ion exchange, including, but not limited to, molten salt baths that are known in the art. The smaller ions in the surface region of the glass are exchanged for the larger ions in the bath. In one non-limiting example, sodium ions in the surface region of the glass are exchanged for potassium ions in the melt. A compressive stress is created in the surface of the glass region by the presence of larger ions that now occupy sites in the surface region. The presence of a compressive stress in the surface region gives rise to a corresponding tensile stress, or central tension, in a central or inner region of the glass to balance forces within the glass.

In a non-limiting example of multiple strengthening steps, a glass sheet is immersed for a first time period in a first salt bath that is at a first temperature. The first salt bath has a first composition (e.g., a combination of different salts or a single salt). At the end of the time period, the glass sheet is removed from the first salt bath. The glass plate is then immersed for a second time period in a second salt bath that is at a second temperature. The second salt bath has a composition that is different from the first salt bath. Between immersion in the first and second salt baths, the glass sheet may be washed (for example, to avoid cross-contamination of the baths), annealed, or preheated to avoid thermal shock during immersion in the second bath. While the above example describes the use of two ion exchange steps to strengthen the glass, it is understood that any number of such steps may be used to achieve a desired level or profile of compressive stress in the glass.

The processes described herein—and the glasses produced by the processes—possess several advantages. In order to achieve a glass that is not frangible, a combination of high surface compressive stress and integrated central tension that is immediately below the frangibility limit is preferred. Glasses that are subjected to ion exchange processes that apply a great deal of compressive stress at the surface must have comparatively shallow depth of layer or they will be frangible, whereas glasses subjected to an ion exchange process that produces a substantial depth of layer without becoming frangible have low compressive stress at the surface.

As long as the frangibility limit or threshold is not exceeded, the compressive stress profile near the surface may be complex. This provides a means to tailor the specific profile for a particular application, rather than rely on the typical single ion exchange profile that is most typical of commercially available ion exchanged glasses. The same frangibility limit applies regardless of whether a glass is annealed or drawn; i.e., a single metric applies regardless of the thermal history of the glass.

The distribution of alkali metal ions in an ion exchange process and higher temperature exposures during ion exchange or subsequent annealing steps that result in stress relaxation can be readily modeled by those methods known in the art. Since the resulting stress profile closely follows the alkali metal concentration profile, the upper limit on integrated central tension itself can be used as a constraint to map all acceptable ion exchange profiles.

The model being used to obtain the ICT for various process conditions uses standard descriptions of diffusion and stress. A mutual diffusivity (i.e., an effective diffusivity related to motion of both potassium (K) and sodium (Na) in opposite directions) is fitted from electron microprobe measurements of concentration profiles from known process conditions. These values follow an Arrhenius trend in reciprocal temperature, as is known in the art. The boundary conditions for the diffusion calculation are based on the salt bath composition and the starting composition of the glass. For a given diffusivity, geometry for the glass plate thickness, and salt bath composition, solution of the resulting one-dimensional diffusion equation proceeds along the lines given, for example, in "The Mathematics of Diffusion," 2nd ed., 1975, by J. Crank. The stress is then proportional to the concentration of $K^+$ ions in the glass after the processing steps are completed, as described, for example, in "Fundamentals of Inorganic Glasses," 2nd ed., 2006, by A. K. Varshneya. In order to obey force equilibrium, it is necessary to subtract a constant so that the resulting stress curve integrates to zero. At higher temperatures, the effects of stress relaxation in the glass begin to become important. Stress relaxation is included in the form of a stretched exponential with a stretching exponent and a temperature-dependent relaxation time that are fitted to reproduce measured stresses for known process conditions. The use of stretched exponentials for stress relaxation in glass is known in the art, as seen, for example, in "Relaxation in Glass and Composites," 1992, by G. W. Scherer. The model has been tested by comparing its predicted concentration profiles with direct measurements of concentrations by electron microprobe, and comparison with direct measurements of compressive stress and depth-of-layer, when available.

An alkali aluminosilicate glass having the approximate composition: 66 mol % $SiO_2$; 14 mol % $Na_2O$; 10 mol % $Al_2O_3$; 0.6 mol % $B_2O_3$; 2.5 mol % $K_2O$; 5.7 mol % MgO; 0.6 mol % CaO; 0.2 mol % $SnO_2$; and 0.02 mol % $ZrO_2$ is a non-limiting example of aluminosilicate glasses that may be strengthened using the multiple ion exchange process described herein. The sodium in this glass can be exchanged with potassium, rubidium, or cesium to produce a region of high compressive stress near the surface and a region under central tension in the interior or central region of a glass part. Unless otherwise specified, it is understood that use of the terms "lithium," "sodium," "potassium," "cesium," and "rubidium" herein refers to the respective monovalent cations of these alkali metals. If rubidium and cesium are used, they can then also be exchanged for potassium ions as well as for sodium ions in the glass. In one embodiment, some or all of the sodium and potassium are replaced by lithium in the glass. The lithium can be then be exchanged with sodium, potassium, rubidium, or cesium to obtain a high surface compressive stress and an interior volume under tension. In order to produce surface compressive stress (as opposed to tension), one or more of the ions in the glass must be replaced by an ion in the salt solution that has a higher atomic number, e.g., potassium replaces sodium in the glass, rubidium replaces potassium in the glass, sodium replaces lithium in the glass, etc.

In one embodiment, damage resistance may be improved by providing at least one compressive stress maximum or "peak" below the surface while retaining high compressive stress at the surface. Ion exchange produces a graded alkali metal concentration profile. This profile has the effect of being a laminate, albeit without any internal interfaces between different glass portions. It is therefore expected that peaks in compressive stress introduced via ion exchange may offer benefits in situations where the glass is subjected to dropping or impact.

Stress profiles obtained for glasses using single (IX1 in Tables 1 and 2) and double ion exchange (IX2 in Tables 1 and 2) are listed in Table 1. Stress profiles obtained for glasses using double and triple ion exchange (IX3 in Table 2) are listed in Table 2. Experiments have been performed on glass samples (approximate composition: 66 mol % $SiO_2$; 14 mol % $Na_2O$; 10 mol % $Al_2O_3$; 0.6 mol % $B_2O_3$; 2.5 mol % $K_2O$; 5.7 mol % MgO; 0.6 mol % CaO; 0.2 mol % $SnO_2$; and 0.02 mol % $ZrO_2$) of different thicknesses (L in Tables 1 and 2) that were subjected to the indicated processes. Frangibility, as defined previously herein, has been assessed by breaking each sample (with the exception of examples 14 and 15, which were not tested) after completion of the strengthening process. Samples having an integrated compressive tension (ICT) of less than about 3 are not frangible, whereas those samples having ICT values of greater than about 3 are frangible. Inspection of the ICT values and frangibility results in Tables 1 and 2 shows that the transition from non-frangible to frangible behavior is not perfectly sharp, but occurs approximately in the region where ICT ranges from about 2.8 MPa·cm up to about 3.2 MPa·cm. Depth of layer values (DOL, defined as the distance from the surface to the location at which the stress changes sign), CS (compressive stress at the surface) and ICT are obtained using model calculations that have been previously described herein. The tabulated values for DOL and CS are similar to measured values. In order to calculate ICT, however, it is necessary to use a diffusion/stress model to provide a detailed shape for the full stress profile. If instrumentation becomes available to measure the actual stress profile through the entire depth-of-layer, ICT may be computed directly from the stress profile without the need of a model. In either case, the ICT serves as means for predicting non-frangible behavior and/or frangible behavior.

grated central tension. If the central tension is sufficiently lowered, as in the triple ion exchange profile, then additional compressive stress can be added close to the surface in an additional ion exchange step. This pattern can be repeated ad infinitum, producing multiple internal peaks if desired, and poses no risk to a downstream application so long as the integrated central tension remains less than or equal to a value in a range from about 2.8 MPa·cm up to about 3.2 MPa·cm and, in some embodiments, less than or equal to about 3.0 MPa·cm.

It will be appreciated by those skilled in the art that additional ion exchange steps or intermediate heat treatments may be used to adjust the integrated central tension to be below an upper limit that is in a range of about 3.2 to about 2.8 MPa·cm, and, in some embodiments, below about 3.0 MPa·cm. In

TABLE 1

Stress profiles obtained for glasses using single and double ion exchange.

| Example | L [cm] | IX1 time [hours] | IX1 T [° C.] | IX1 Salt | Anneal time [min] | Anneal T [° C.] | IX2 time | IX2 T [° C.] | IX2 Salt | DOL [μm] | CS [MPa] | ICT [MPa * cm] | Frangible? |
|---|---|---|---|---|---|---|---|---|---|---|---|---|---|
| 1 | 0.197 | 8.5 | 410 | KNO3 | n.a. | n.a. | n.a. | n.a. | n.a. | 50 | −793 | 2.6 | No |
| 2 | 0.197 | 7.5 | 410 | KNO3 | n.a. | n.a. | n.a. | n.a. | n.a. | 47 | −796 | 2.4 | No |
| 3 | 0.128 | 12 | 410 | KNO3 | n.a. | n.a. | n.a. | n.a. | n.a. | 47 | −773 | 2.9 | No |
| 4 | 0.158 | 12 | 410 | KNO3 | n.a. | n.a. | n.a. | n.a. | n.a. | 56 | −778 | 3 | Yes |
| 5 | 0.197 | 16 | 410 | KNO3 | n.a. | n.a. | n.a. | n.a. | n.a. | 66 | −770 | 3.4 | Yes |
| 6 | 0.197 | 12 | 410 | KNO3 | 10 | 480 | 15 | 410 | KNO3 | 60 | −718 | 3 | No |
| 7 | 0.197 | 7.5 | 410 | KNO3 | 45 | 480 | 15 | 410 | KNO3 | 59 | −649 | 2.5 | No |
| 8 | 0.197 | 16 | 430 | KNO3 | 10 | 480 | 10 | 430 | KNO3 | 82 | −715 | 4.4 | Yes |
| 9 | 0.197 | 16 | 430 | KNO3 | 10 | 480 | 30 | 430 | KNO3 | 83 | −735 | 4.4 | Yes |
| 10 | 0.197 | 16 | 430 | KNO3 | 10 | 480 | 60 | 430 | 80/20* | 87 | −240 | 3.8 | No | n.a. = not applicable; sample not subjected to this step.
80/20 = 80% NaNO3 and 20% KNO3 by weight.

TABLE 2

Stress profiles obtained for glasses using double and triple ion exchange.

| Example | L [cm] | IX1 time [hours] | IX1 T [° C.] | IX1 Salt | IX2 time [min] | IX2 T [° C.] | IX2 Salt | IX3 time | IX3 T [° C.] | IX3 Salt | DOL [μm] | CS [MPa] | ICT [MPa * cm] | Frangible? |
|---|---|---|---|---|---|---|---|---|---|---|---|---|---|---|
| 11 | 0.197 | 18 | 410 | KNO3 | 100 | 410 | 80/20 | 10 | 410 | KNO3 | 73 | −557 | 3.2 | No |
| 12 | 0.197 | 18 | 410 | KNO3 | 100 | 410 | 80/20 | 40 | 410 | KNO3 | 74 | −602 | 3.3 | Yes |
| 13 | 0.197 | 18 | 410 | KNO3 | 300 | 410 | 80/20 | 40 | 410 | KNO3 | 81 | −546 | 3 | Yes |
| 14 | 0.197 | 18 | 410 | KNO3 | 100 | 410 | NaNO3 | n.a. | n.a. | n.a. | 74 | −172 | 3 | Not tested |
| 15 | 0.197 | 18 | 410 | KNO3 | 200 | 410 | NaNO3 | n.a. | n.a. | n.a. | 78 | −134 | 2.7 | Not tested |

Figure 3:
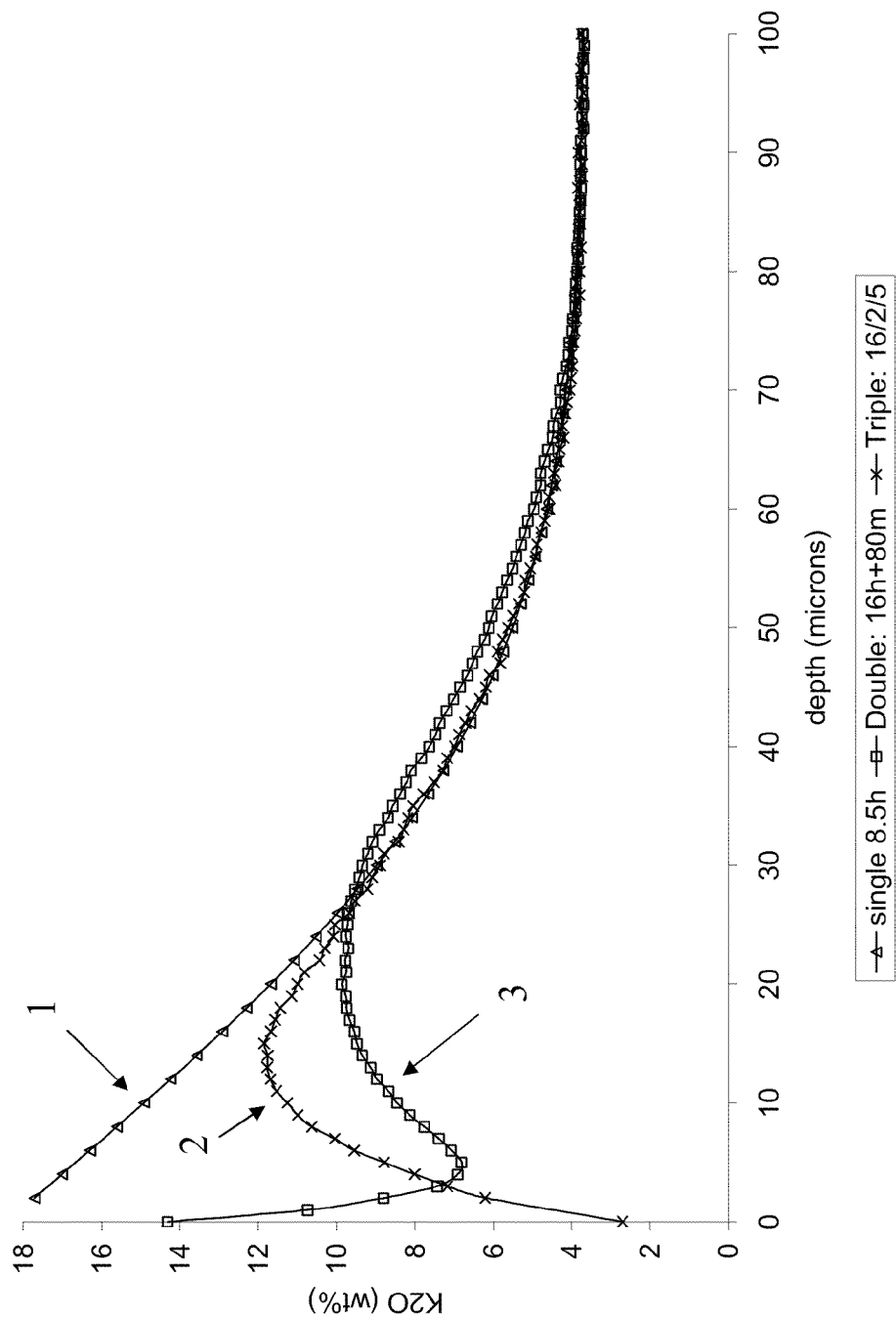
FIG. 3 is a plot of potassium oxide concentration as a function of depth for alkali aluminosilicate glass samples that have undergone single, double, and triple ion exchange.

Ion exchange profiles obtained for samples that have undergone single, double, and triple ion exchange processes are plotted as a function of depth in FIG. 3. The ion exchange profiles represent the potassium concentration, as determined by electron microprobe analysis, as a function of depth in the glass samples. The ion exchange/potassium oxide profile obtained by single ion exchange for 8.5 hours in a pure KNO₃ bath at 410° C. (1 in FIG. 3) is compared to two multiple ion exchange non-frangible profiles: double ion exchange (2 in FIG. 3) comprising 16 hours in a pure KNO₃ bath at 410° C., followed by 80 minutes in a pure NaNO₃ bath at 410° C.; and triple ion exchange (3 in FIG. 3) comprising 16 hours in a pure KNO₃ bath at 410° C., followed by 3 hours in a pure NaNO₃ bath at 410° C., and then followed again by 20 minutes in a pure KNO₃ bath at 410° C. (Example 10 in Table 3). The extra time that the glass is immersed in a pure KNO₃ salt bath produces a much deeper layer of compressive stress. Since so much stress is concentrated at the surface, the comparatively brief ion exchange in a pure NaNO₃ bath serves to reduce the integrated compressive stress and hence to lower the inteaddition, various mixtures of sodium and potassium salts in the bath may be used to keep the integrated central tension below the frangibility limit of a value in a range from about 2.8 MPa·cm up to about 3.2 MPa·cm, thus allowing a shallow layer of high compressive stress to be subsequently added, analogous to Example 4 described above. Similarly, the second step of a triple ion exchange may use a mixed salt bath (e.g., NaNO₃ and KNO₃) to relieve some of the compressive stress and provide a greater compressive stress maximum or "peak" within the compressive layer, with the proviso that this ion exchange does not exceed the frangibility limit—i.e., ICT has a value in a range from about 2.8 MPa·cm up to about 3.2 MPa·cm—and does not relieve as much compressive stress as would ion exchange in a bath containing only NaNO₃.

In addition, multiple compressive stress maxima or "peaks" at different depths may be achieved if desired. In those instances where the glass initially contains lithium rather than sodium or the salt bath contains rubidium or cesium rather than sodium or potassium, compressive stress distributions may be different than that obtained using a single, simple ion exchange.

While typical embodiments have been set forth for the purpose of illustration, the foregoing description should not be deemed to be a limitation on the scope of the disclosure or the appended claims. Other means, such as alternative chemical means or thermal tempering, for example, may be used to strengthen the glass. Moreover, different means of strengthening the glass may be used in combination with each other to achieve a desired level or profile of compressive stress. In one alternative embodiment, metal ions, such as silver or the like, may be used instead of—or in combination with—alkali metal ions in the ion exchange process. Accordingly, various modifications, adaptations, and alternatives may occur to one skilled in the art without departing from the spirit and scope of this disclosure or the appended claims.

The invention claimed is:

1. A method of strengthening a glass, the method comprising the steps of:
   a. providing the glass, the glass having a surface; and
   b. successively immersing at least a portion of the glass in a plurality of ion exchange baths, the ion exchange baths comprising a first ion exchange bath, the first ion exchange bath comprising a first metal, and a second ion exchange bath, the second ion exchange bath comprising a metal that is different from the first metal, to create a compressive stress in an outer region to strengthen the glass, the outer region extending from the surface to a depth of layer, wherein the compressive stress creates an integrated central tension of less than or equal to about 3.2 MPa·cm in a central tensile region of the glass, wherein each of the plurality of ion exchange baths are at a temperature in a range from about 410° C. to about 430° C.

2. The method of claim 1, wherein the depth of layer is at least 50 μm.

3. The method of claim 1, wherein the compressive stress is at least about 200 MPa.

4. The method of claim 1, wherein the glass has a liquidus viscosity of at least 130 kilopoise.

5. The method of claim 1, wherein the glass is one of a planar sheet and a three-dimensional curved sheet.

6. The method of claim 5, wherein the glass is one of a cover plate and a display window in an electronic device.

7. The method of claim 1, wherein the successive ion exchange baths have compositions that are different from each other.

8. The method of claim 1, further comprising annealing the glass between successive immersions of the glass in the plurality of ion exchange baths.

9. The method of claim 1, wherein the first metal and second metal are alkali metals.

10. The method of claim 1, wherein each of the plurality of ion exchange baths comprises at least one alkali metal salt.

11. The method of claim 1, wherein the glass is an alkali aluminosilicate glass.

12. The method of claim 11, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % ≤ $Li_2O+Na_2O+K_2O$ ≤ 20 mol % and 0 mol % ≤ MgO+CaO ≤ 10 mol %.

13. The method of claim 1, wherein the glass, when strengthened, is substantially free of frangible behavior.

* * * * *